(12) United States Patent
Huck

(10) Patent No.: US 11,703,407 B2
(45) Date of Patent: Jul. 18, 2023

(54) MULTIFUNCTIONAL SENSOR FOR THE PROCESS INDUSTRY

(71) Applicant: Siemens Aktiengesellschaft, Munich (DE)

(72) Inventor: Ralf Huck, Großkrotzenburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 223 days.

(21) Appl. No.: 17/110,704

(22) Filed: Dec. 3, 2020

(65) Prior Publication Data

US 2021/0172816 A1 Jun. 10, 2021

(30) Foreign Application Priority Data

Dec. 4, 2019 (DE) .......................... 102019218890.7
Jan. 9, 2020 (DE) .......................... 102020200213.4

(51) Int. Cl.
*G01L 9/00* (2006.01)
*G01L 19/00* (2006.01)

(52) U.S. Cl.
CPC ........ *G01L 9/0052* (2013.01); *G01L 19/0092* (2013.01)

(58) Field of Classification Search
CPC ............................ G01L 19/0092; G01L 9/0052
See application file for complete search history.

(56) References Cited

U.S. PATENT DOCUMENTS

| 5,503,026 A * | 4/1996 | Bohm ....................... G01F 1/58 73/861.11 |
| 5,670,724 A | 9/1997 | Batey |
| 5,872,315 A * | 2/1999 | Nagase ............... G01L 19/0038 73/726 |
| 6,804,613 B2 * | 10/2004 | Ishikawa ................. G01F 25/10 702/65 |

(Continued)

FOREIGN PATENT DOCUMENTS

| CN | 101036041 | 9/2007 |
| CN | 101287967 | 10/2008 |

(Continued)

*Primary Examiner* — David Z Huang
*Assistant Examiner* — Jean F Morello
(74) *Attorney, Agent, or Firm* — Cozen O'Connor

(57) ABSTRACT

A multifunctional sensor has the a process connection housing with a process-side opening, pressure measurement cell with a measurement membrane arranged in the process connection housing, which closes the opening in the process connection housing and which has strain measurement resistors on its side facing away from the process, where a magnet assembly is arranged in the process connection housing, the magnetic field of which is concentrated on a central region of the measurement membrane and penetrates through this into the process, electrodes lying diametrically opposite one another are formed outside the central region on the side of the measurement membrane facing the process, and where the process connection housing contains electronic measuring equipment which is formed to interact with the strain measurement resistors and the electrodes for pressure measurement and magnetic-inductive flow measurement.

8 Claims, 3 Drawing Sheets

(56) References Cited

U.S. PATENT DOCUMENTS

| | | | |
|---|---|---|---|
| 6,813,956 B2* | 11/2004 | Kurtz | G01L 9/0054 |
| | | | 73/754 |
| 7,055,396 B1 | 6/2006 | Thai et al. | |
| 7,946,184 B2* | 5/2011 | Budmiger | G01F 1/58 |
| | | | 73/861.12 |
| 10,670,437 B2* | 6/2020 | Brockhaus | G01D 21/02 |
| 2003/0041670 A1* | 3/2003 | Hirota | G01L 19/148 |
| | | | 73/720 |
| 2005/0061079 A1* | 3/2005 | Schulman | A61B 5/03 |
| | | | 73/715 |
| 2005/0210992 A1* | 9/2005 | Tohyama | G01L 19/003 |
| | | | 73/715 |
| 2006/0042394 A1* | 3/2006 | Kosh | G01L 9/045 |
| | | | 73/753 |
| 2009/0205438 A1 | 8/2009 | Budmiger | |
| 2012/0001278 A1* | 1/2012 | Ooya | G01L 19/04 |
| | | | 257/419 |
| 2016/0377498 A1 | 12/2016 | Hedtke et al. | |
| 2018/0356267 A1 | 12/2018 | Brockhaus et al. | |
| 2019/0226886 A1* | 7/2019 | Bromley | G01D 18/00 |

FOREIGN PATENT DOCUMENTS

| | | |
|---|---|---|
| CN | 106289342 | 1/2017 |
| CN | 109084850 | 12/2018 |
| CN | 109716073 | 5/2019 |
| DE | 3319807 | 12/1984 |
| DE | 102018209563 | 7/2019 |
| DE | 102018130793 | 6/2020 |
| DE | 102018132885 | 6/2020 |
| EP | 1431716 | 6/2004 |
| JP | 2005180962 | 7/2005 |

* cited by examiner

MULTIFUNCTIONAL SENSOR FOR THE PROCESS INDUSTRY

BACKGROUND OF THE INVENTION

1. Field of the Invention

The invention relates to a multifunctional sensor for the process industry.

2. Description of the Related Art

The traditional measured variables of process automation technology in pipelines, such as temperature, pressure, flow rate, vibration, conductivity, pH value and density, are measured with sensors using widely varying physical principles such as, for example, resistive, piezoresistive, capacitive, magnetic-inductive, Coriolis, electrical conductivity, thermal conductivity, or density, and are converted into an industry-standard measuring signal with the aid of associated transmitters.

However, only a few multivariable systems are known, which also in most cases detect only a few of these measured variables via the same process connection. Thus, for example, there are pressure sensors or vortex flowmeters with integrated measurement of the process temperature.

Also known are systems in which the measurements are performed in a pipe section or an intermediate flange. These include multivariable pressure sensors with integrated difference pressure measurement, which in conjunction with a shutter also measure flow rate and temperature, or Coriolis flowmeters or ultrasound flowmeters that can be employed to measure density.

Coriolis and ultrasound flowmeters for the process industry are generally what is known as 4-wire measuring devices, which do not enable energy self-sufficiency to be measured over many years.

The energy consumption is, on the one hand, determined by the signal transmission, which frequently consumes the majority of the available energy (e.g., 4-20 mA two-wire technology). To minimize the energy consumption, a suitable signal transmission with consumption as low as possible (generally 3-wire technology or radio) is therefore initially used, and then a measurement method is selected, which itself consumes as little energy as possible (e.g., piezoresistive with the largest possible resistances). To further reduce the energy consumption, the measurement can be performed at a reduced sampling rate, where the energy saving achieved results from the sampling ratio.

Furthermore, it is often the case that no voltage supply is present at the measuring points. The sensors must hence work self-sufficiently, in other words, for example, they must be supplied from batteries or energy converters, such as solar cells. Here, a minimized energy consumption permits smaller energy stores with the same sampling rate or higher sampling rates with the same energy reserve. In many applications, however, a continuous sampling rate, in some cases with sampling rates up into the kHz range, are necessary, so that continuously measuring, energy-self-sufficient systems have hitherto been ruled out here.

DE 10 2018 209 563 B3 discloses a multifunctional sensor for the process industry that has a process connection housing with a process-side opening. Arranged in the process connection housing is a pressure measurement cell with a measurement membrane closing the process-side opening and that is provided with strain measurement resistors on its side facing away from the process. There is a piezoceramic annular component between an inner stop in the process connection housing and the pressure measurement cell. The strain measurement resistors and the piezoceramic annular component are connected to electronic measuring equipment for pressure measurement and ultrasound-based fill-level measurement.

It is further known for the flow rate of fluids with an electrical conductivity above a minimum conductivity to be measured by generating a magnetic field extending perpendicularly to its direction of flow in the fluid, such that a voltage is induced perpendicular to the direction of flow and to the magnetic field that is proportional to the flow velocity and thus to the flow rate and is tapped using measurement electrodes and then evaluated. Such magnetic-inductive flowmeters are known both as immersion sensors and in the form of inline devices. Thus, a magnetic-inductive flowmeter with a probe immersed in the fluid is disclosed in DE 33 19 807 A1, JP 2005-180962 A or U.S. Pat. No. 7,055,396 B1, and contains an electromagnet in a housing and has two electrodes arranged externally spaced apart from one another.

EP 1 431 716 A1 discloses an inline flowmeter, in which a constant magnetic field is generated, for example, via a permanent magnet, such that the flowmeter can be operated using as little energy as possible and does not bring about any interference fields. A second pair of electrodes which is aligned parallel to the magnetic field and thus perpendicular to the pair of measurement electrodes serves to receive interference voltages that are subtracted from the measurement voltage.

U.S. Pat. No. 5,670,724 A discloses a magnetic-inductive flowmeter with a pair of measurement electrodes and a pressure measurement transformer arranged directly between the two measurement electrodes.

The earlier, non-prior published, application DE 10 2018 130 793 A1 relates to a magnetic-inductive flowmeter with at least one electrode assembly which comprises a pin-shaped electrode body with an end face for tapping the measured voltage, a pressure measurement transformer for detecting the fluid pressure acting on the end face and a temperature sensor for determining the fluid temperature.

The earlier, non prior published, application DE 10 2018 132 885 A1 relates to a magnetic-inductive flowmeter with a probe immersed in the fluid which in a housing has an electromagnet, a pair of measurement electrodes and at least one sensor for determining a process parameter of the fluid.

In the process industry it is often necessary to measure multiple process variables simultaneously, without the need for separate process measurement converters, such as a pressure measurement converter and a flow measurement converter.

SUMMARY OF THE INVENTION

In view of the foregoing, it is therefore an object of the invention to reduce the effort required for simultaneous measurement of pressure and flow rate.

This and other objects and advantages are achieved in accordance with the invention by a multifunctional sensor for the process industry that includes a process connection housing with a process-side opening, a pressure measurement cell with a measurement membrane made of an insulating material arranged in the process connection housing, which closes the opening in the process connection housing and which has strain measurement resistors on its side facing away from the process. The multifunctional sensor also includes a magnet assembly arranged in the process connection housing, the magnetic field of which is concentrated on a central region of the measurement membrane and penetrates through this into the process, and includes electrodes lying diametrically opposite one another that are formed outside the central region on the side of the measurement membrane facing the process. In accordance with the invention, the process connection housing contains electronic measuring equipment that is connected to the strain measurement resistors and the electrodes and in interaction with these is formed for pressure measurement and magnetic-inductive flow measurement.

The inventive multifunctional sensor advantageously combines a pressure meter and a magnetic-inductive flowmeter in a single device with a single process connection.

To remove interference, such as offset interference or noise, from the result of the magnetic-inductive flow measurement, further electrodes can be formed on the side of the measurement membrane facing the process, which lie diametrically opposite one another perpendicular to the arrangement of the electrodes. The electronic measuring equipment is then further configured to correct the magnetic-inductive flow measurement based on the electrical voltage detected between the further electrodes. An impedance or conductivity of a process fluid can additionally be measured between the further electrodes, to detect when the process fluid in a pipe or container rises as far as the multifunctional sensor, or to analyze a change in the process fluid when, for example, waste water is turned into drinking water.

In an advantageous embodiment of the inventive multifunctional sensor, the pressure membrane cell with the measurement membrane lies on an inner shoulder of the process connection housing surrounding the opening, where the process connection housing contains an inner stop, between which and the rear of the pressure measurement cell facing away from the process lies a piezoceramic annular component.

The electronic measuring equipment is further connected to the piezoceramic annular component and is configured to detect pressure surges and/or for ultrasound-based fill-level measurement or flow measurement. In the case of fill-level measurement, the propagation time between sending an ultrasound pulse and receiving the reflected pulse (echo) is measured as the measurement for the distance between the measurement membrane of the multifunctional sensor and the surface of a process medium. If the process connection is suitably shaped or aligned, then a flow measurement using the propagation time difference principle is also possible, where different propagation times of ultrasound pulses are evaluated as a function of the direction of flow of a flowing process fluid.

Furthermore, dynamic pressure profiles, such as pressure fluctuations or vibrations, can be recorded with the piezoceramic annular component and evaluated in the electronic measuring equipment.

The inventive multifunctional sensor preferably contains a battery for its exclusive current supply. To ensure a battery service life that is as high as possible, the electronic measuring equipment can have a trigger input, via which it can be moved from an inactive state to an active state. The piezoceramic annular component can in particular be connected to the trigger input, in order to detect a pressure surge event. Instead or additionally, the electrodes and/or the further electrodes of the magnetic-inductive flowmeter can be connected to detect when the electrodes come into contact with a process medium. The multifunctional sensor is hence most of the time in sleep mode, in which virtually no energy is being used, and is activated only after one of the mentioned events is detected for further measurements, such as a pressure measurement using the pressure sensor or a magnetic-inductive flow measurement. Here, the electronic measuring equipment determines measurement data, preferably raw measurement data, for a predefined time, which can be transmitted in wired mode, but preferably wirelessly, to a higher-level unit.

Besides the pressure and flow measurement, a measurement of the process temperature can advantageously also occur, because at least one temperature sensor is fixed to the side of the measurement membrane facing away from the process and the electronic measuring equipment of the sensor is further configured to measure the temperature. Besides the measurement of the process temperature, the thermal conductivity or the flow rate of a process fluid can also be measured, because one of the temperature sensors is operated as a heating element and, via the temperature sensor or the other temperature sensors, a thermal outflow or transportation via the process fluid is measured.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below on the basis of exemplary embodiments and with reference to the figures in the drawing, in which.

DETAILED DESCRIPTION OF THE EXEMPLARY EMBODIMENTS

Figure 1:
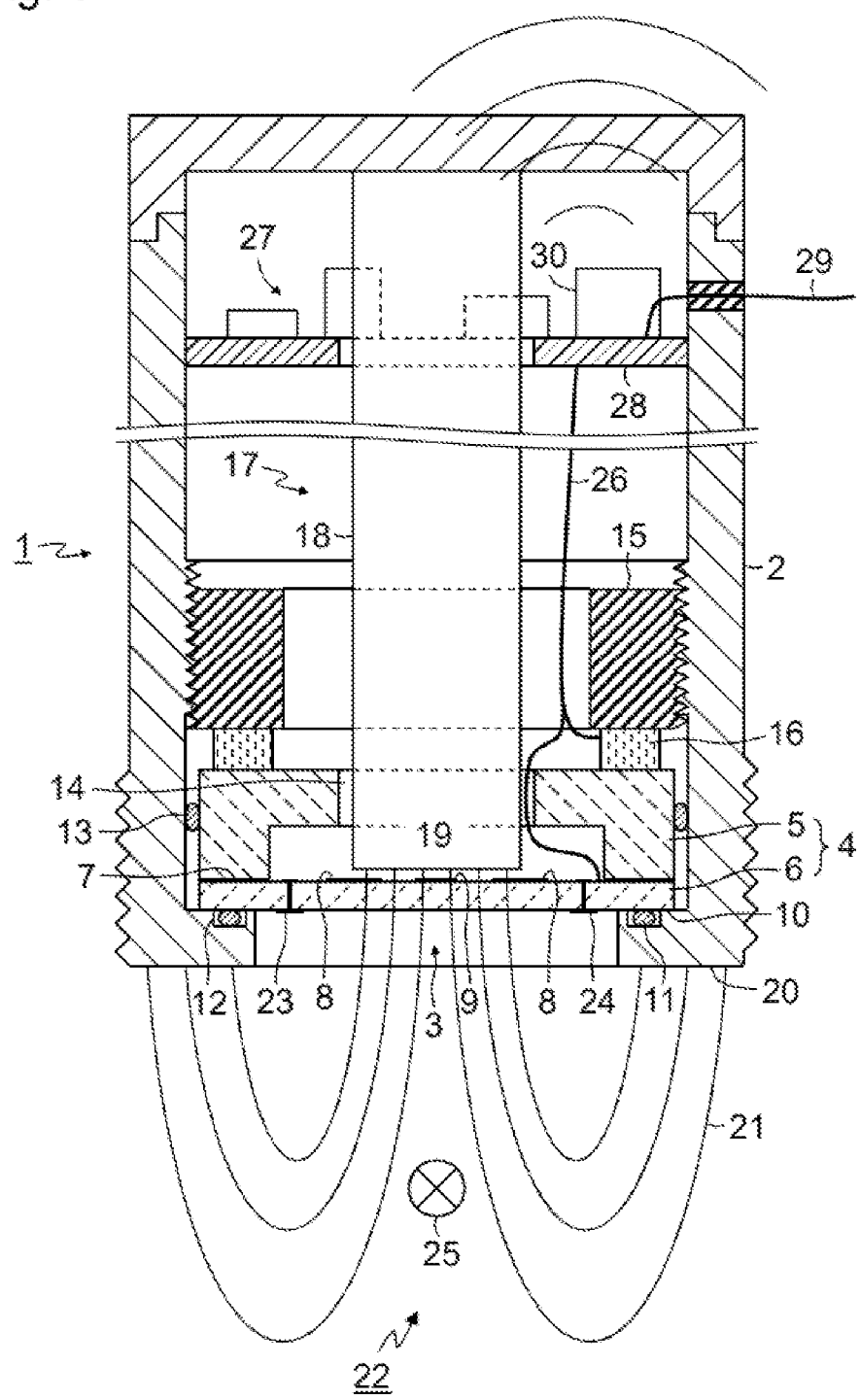
FIG. 1 is a schematic illustration of an exemplary embodiment of the inventive multifunctional sensor.

The same reference characters have the same meaning in the various figures. The illustrations are purely schematic and do not represent size ratios.

FIG. 1 shows a multifunctional sensor 1 for the process industry with a cylindrical process connection housing 2 made of metal, which contains a circular opening 3 located on the process side. Arranged in the process connection housing 2 is a can-shaped pressure measurement cell 4 that consists of a measurement cell body 5 and a measurement membrane 6 made of an insulating material held thereon. Both the measurement membrane 6 and the measurement cell body 5 preferably consist of a ceramic and are connected to one another by melting a glass frit 7. Strain measurement resistors (strain measurement strips) 8 and one or more temperature sensors (e.g. Positive Temperature Coefficient (PTC) resistors) 9 are attached to the side of the measurement membrane 6 facing away from the process. The pressure measurement cell 4 abuts with the measurement membrane 5 an inner shoulder 10 of the process connection housing 2 surrounding the opening 3 and closes the opening 3 vacuum-tight via a sealing ring 11 in a circumferential groove 12 contained in the shoulder 10. A centering ring 13 between the cylindrical side wall of the pressure measurement cell 4 and the inner wall of the process connection housing 2 serves for the coaxial centering of the pressure measurement cell 4 in the process connection housing 2. The measurement cell body 5 contains a central circular opening 14 on its rear side facing away from the process.

An annular element 15 is held in the process connection housing 2 and is connected externally to the inner wall of the process connection housing 2 and forms an inner stop, between which and the rear side of the pressure measurement cell 4 facing away from the process lies an axially acting piezoceramic annular component 16 in force-fit axial contact with the pressure measurement cell 4 and the stop 15. Axial oscillations generated by the piezoceramic annular component 16 during electrical excitation can be transmitted via the measurement cell body 5 to the measurement membrane 6 and excite this to oscillate. Conversely, axial forces (e.g., pressure or vibrations) acting on the measurement membrane 6 are transmitted to the piezoceramic annular component 16 that generates a corresponding measurable piezo voltage.

A magnet assembly 17 is furthermore arranged in the process connection housing 2 and is formed here as a magnet housing, e.g., in the form of a pot magnet with a magnet 18 and the process connection housing 2. The exemplary illustrated embodiment is a permanent magnet that extends through the openings of the annular element (stop) 15 and the piezoceramic annular component 16, and through the circular opening 14 in the rear wall of the measurement cell body 5 into the interior of the pressure measurement cell 4, where the permanent magnet ends with a magnetic pole 19 in front of the measurement membrane 6. The other magnetic pole 20 is formed by the region of the process connection housing 2 annularly surrounding the opening 3. Alternatively, an electromagnet can be provided. A magnetic field 21 extends between the magnetic poles 19, 20 and is concentrated on a central region of the measurement membrane 6 and penetrates through this into a process environment or measurement environment ('process' for short) 22. Electrodes 23, 24 diametrically opposite one another are formed on the side of the measurement membrane 6 facing the process 22 in the edge area, i.e., outside the central region crossed by the magnetic field 21, in order to be able to detect a measurement voltage generated magnetically-inductively in a flowing process fluid 25. The piezoceramic annular component 16 and the strain measurement resistors 8, temperature sensors 9 and electrodes 23, 24 on the measurement membrane 6 are connected via lines 26 to electronic measurement equipment 27 on a PCB 28. A battery (not shown here) for supplying current to the multifunctional sensor 1 can furthermore be accommodated in the process connection housing 2. The electronic measuring equipment 27 is configured to detect process variables in interaction with the piezoceramic annular component 16, the strain measurement resistors 8, temperature sensors 9 and electrodes 23, 24, to evaluate them to a certain degree and to transmit them via a wired interface 29 and/or a wireless interface (radio module) 30 to a higher-level point.

Figure 2:
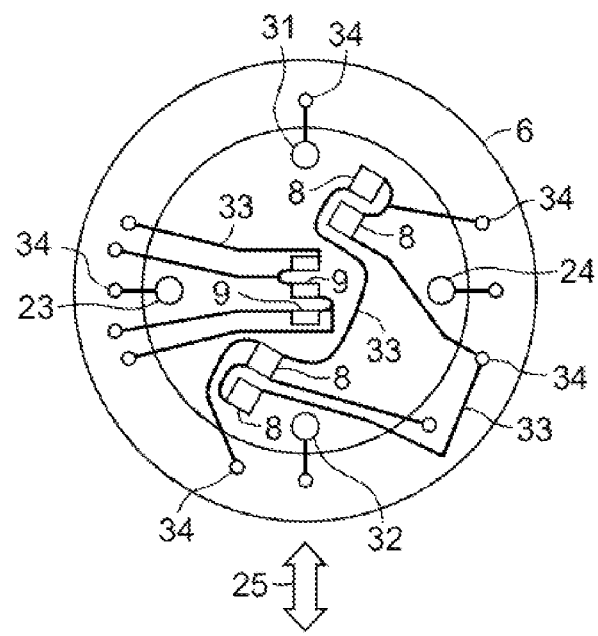
FIG. 2 is a schematic illustration of an exemplary measurement membrane of the pressure measurement cell in accordance with the invention.

FIG. 2 shows by way of example the measurement membrane 6 in a view of the side facing away from the process. The strain measurement resistors 8, three temperature sensors 9, the two through-contacted electrodes 23, 24 and two further through-contacted electrodes 31, 32 arranged on the side of the membrane 6 facing the process are connected via conductor paths 33 to connection points 34 in the edge region of the measurement membrane 6 (optionally in the vicinity or in the region of the glass frit 7). Here, the strain measurement resistors 8 are connected in a measurement bridge, where two resistors are ideally located in the region of maximum compression and the other two resistors in the region of maximum strain. The connection points 34 are connected to the electronic measuring equipment 27 via the lines 26 (FIG. 1). The electrodes 23, 24 and the further electrodes 31, 32 are arranged crosswise opposite one another, where the electrodes 23, 24 lie on a line transverse to the direction of flow of the process fluid 25 and the further electrodes 31, 32 on a line longitudinal thereto. Ideally, the distance between the respectively opposite electrodes 23, 24 or 31, 32 is smaller than half the distance between an electrode 23, 24, 31, 32 and the edge region of the sensor 1. Otherwise, measurements of voltage or conductivity would be falsified by the conductive clamping of the sensor. Furthermore, the maximum freedom from offset interference or noise is produced by an arrangement of the electrodes 23, 24, 31, 32 that is as symmetrical as possible.

In the illustrated example, the three temperature sensors 9 are likewise arranged on a line longitudinal to the direction of flow of the process fluid 25.

Figure 3:
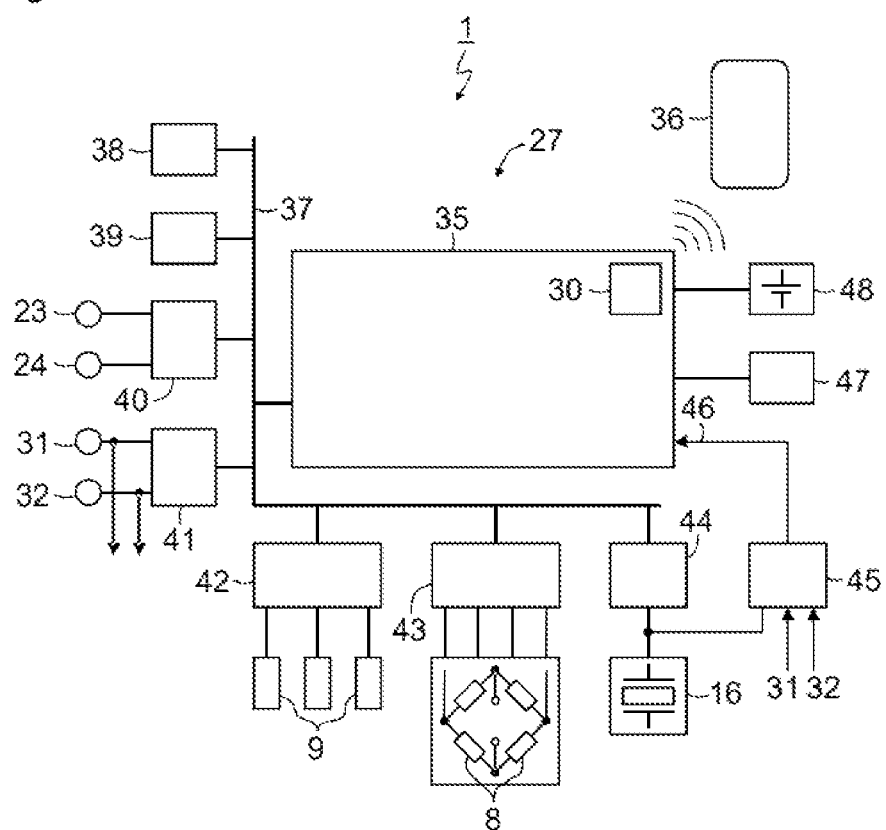
FIG. 3 is a schematic block diagram of the inventive multifunctional sensor.

FIG. 3 shows a schematic block diagram of an exemplary embodiment of the multifunctional sensor 1. The electronic measuring equipment 27 contains a current-saving microcontroller 35, in which the radio module 30 configured here in the exemplary illustration for short-range radio connections (e.g. Bluetooth, WLAN) can be integrated. For example, a mobile communication terminal 36, such as a gateway, smartphone, tablet computer or laptop, can be considered as a receiver for the data transmitted by the multifunctional sensor 1 or read out from the electronic measuring equipment 27, with which the data can (where necessary) be evaluated, visualized or forwarded to a remote location (not shown here), e.g., a local server or a cloud server. The mobile communication terminal 36 can also be used for parameterizing the multifunctional sensor 1. The radio module 30 can optionally also be fitted with a long-range radio connection (Global System for Mobile communications (GSM), Low Power, Wide Area (LoRaWa)), such that a local, user-side receiver can be dispensed with which, however, is associated with a higher energy consumption.

A RAM 38, a flash memory 39 and measurement ports 40, 41, 42, 43, 44 for the various individual sensors, here the electrodes 23, 24, the further electrodes 31, 32, the temperature sensors 9, the strain measurement resistors 8 and the piezoceramic annular component 16, are connected to the microcontroller 35 via a bus system 37. The measurement ports 40, 41, 42, 43, 44 condition the analog sensor signals and convert them into digital values. The piezoceramic annular component 16 and/or the further electrodes 31, 32 (or if appropriate the electrodes 23, 24) can furthermore be connected to a trigger input 46 of the microcontroller 35 via a trigger port 45. Lastly, the multifunctional sensor 1 has a real-time clock 47 and an internal battery 48 for supplying current to the electrical and electronic components.

To ensure that the battery service life is as long as possible, the multifunctional sensor 1 can be in a sleep mode most of the time, in which virtually no energy is consumed. During this time, the signals (voltages) of the piezoceramic annular component 16 and/or of the further electrodes 31, 32 are monitored at the trigger port 45, in order to detect a pressure surge event in the process 22 and/or a contacting of the electrodes 31, 32 by the process fluid 25. A practical example of this is the identification of impermissible discharges into predominantly dry channels due to an increase in pressure or into predominantly filled channels due to a change in conductivity or a combination of both. While the process 22 is being monitored for events, the real-time clock 47 works in order to be able to assign a unique date to an event that occurs. Furthermore, at regular time intervals, such as every 10 seconds, Bluetooth Low Energy Advertising can be performed by the radio module 30. As soon as an event is detected, the multifunctional sensor 1 is moved via the trigger input 46 of the microcontroller 35 out of sleep mode into a measurement mode. During a predefined time-interval, data from the various individual sensors connected to the measurement ports 40, 41, 42, 43, 44 can be recorded and stored in the RAM 38. The start of data recording is given a time stamp by the real-time clock 47. After a measurement cycle or recording cycle, the raw data is copied out of the RAM 38 into the flash memory 39. The multifunctional sensor 1 can then return to sleep mode.

The data sets from multiple measurements can be stored in the flash memory 39, in order to be transferred, e.g., if need be or on request via the radio interface of the radio module 30 to the mobile communication terminal 36 or via a gateway to a cloud. At this location, the raw data can then be evaluated or further processed. In principle, however, the evaluation or further processing is also possible using the microcontroller 30 which, however, is associated with a higher energy consumption of the multifunctional sensor 1. When data is adeptly preprocessed and/or compressed, shorter transmission times can be achieved, which in turn has an advantageous effect on the energy consumption.

Depending on the type of event detected, different measurements can be activated. Thus, if the further electrodes 31, 32 are contacted by the process fluid 25, then a magnetic-inductive flow measurement of the process fluid 25 via the pair of electrodes 23, 24 can be triggered. A prerequisite here is that the multifunctional sensor 1 is integrated into the process system such that the pair of electrodes 23, 24 is aligned largely perpendicular to the direction of flow of the process fluid 25. Using the further pair of electrodes 31, 32 aligned perpendicular to the pair of measurement electrodes 23, 24 and thus parallel to the direction of flow of the process fluid 25, interference voltages can be recorded that are subtracted from the measurement voltage of the pair of measurement electrodes 23, 24. It is also possible to detect a measurement voltage, in each case, at each of the two pairs of electrodes 23, 24 and 31, 32 and using the two orthogonal measurement voltages to determine a directional vector for the direction of flow of the process fluid 25. To obtain a better signal-to-noise ratio, the voltage measurement can be performed in a chopper procedure alternately at the pair of electrodes 31, 32 in the flow rate direction and transversely to the flow rate direction.

Instead of the magnetic-inductive flow measurement or alternating therewith, an impedance or conductivity measurement can occur between the electrodes 23, 24, 31, 32 in order to determine properties of the process fluid, such as via impedance spectroscopy.

When a pressure surge event is detected by the piezoceramic annular component 16, a subsequent pressure measurement can, for example, be triggered via the pressure measurement cell 4.

The piezoceramic annular component 16 further enables an ultrasound-based fill level measurement, in which an acoustic pulse is sent into the process 22 via the measurement membrane 6 by excitation of the piezoceramic annular component 16 and an echo is received from a reflecting surface and its propagation time is evaluated. Finally, dynamic pressure profiles such as pressure fluctuations or vibrations can be recorded with the piezoceramic annular component 16. An example of this is the use of the multifunctional sensor 1 for eddy flow measurement, where a body in a flow is arranged upstream in the process fluid 25, behind which opposing eddies form and the pressure fluctuations induced thereby in the process fluid 25 are measured. The body in the flow can, where appropriate, be a valve that is located in a pipeline upstream of the multifunctional sensor 1.

With the temperature sensors 9, the thermal conductivity or the flow rate of the process fluid 25 can also be measured, in addition to the measurement of the temperature thereof. To this end, for example, the central one of the three temperature sensors 9 is operated as a heating element and via the other two temperature sensors 9 the heat dissipation or transport via the process fluid 25 is measured.

Which measurements or combinations of measurements are performed at which times or after which events can be set at the multifunctional sensor 1 as part of parameterization.

Figure 4:
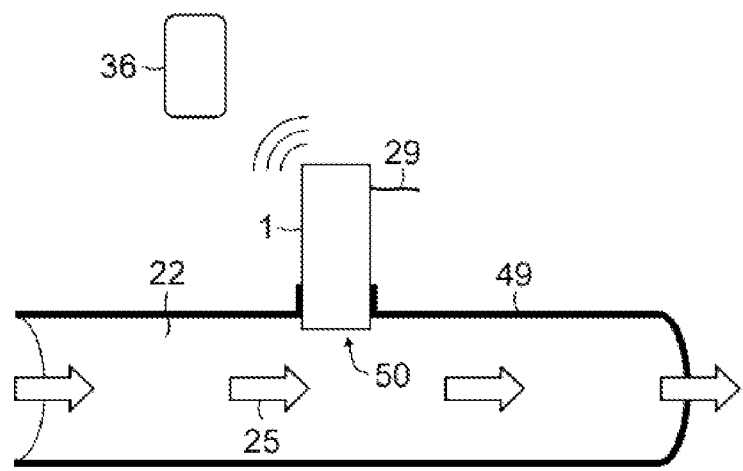
FIG. 4 is a schematic illustration of an exemplary embodiment of the inventive multifunctional sensor, which is mounted on a process pipe.

FIG. 4 shows a process pipe 49, through which the process fluid 25 flows. The multifunctional sensor 1 is mounted on the process pipe 49 and via an opening 50 has access to the process environment or measurement environment 22 in the interior of the process pipe 49, in order to measure or monitor the pressure and the flow rate of the process fluid 25 there. The process connection housing 2 of the sensor 1 can, for example, be screwed into the opening 50.

Further individual sensors, such as a vibration or acceleration sensor, arranged in the process connection housing 2 or an optical sensor for fill level or opacity measurement of the process fluid 25 arranged in the region of the opening 3 of the process connection housing 2 can readily be added to the inventive multifunctional sensor 1. These further individual sensors can then be, in the same way as with the other sensors, such as the temperature sensors 9, connected to the microcontroller 35 via measurement ports.

As already mentioned, an electromagnet can be provided as an alternative to the permanent magnet 18 (FIG. 1). As a result, certain measurement errors such as aging or temperature range can be reduced or compensated for by actuation of the electromagnet, which however is detrimental to the energy requirement.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A multifunctional sensor for process industries, comprising:
    a process connection housing having a process-side opening;
    a pressure measurement cell having a measurement membrane, formed from an insulation material and arranged in the process connection housing, said measurement membrane closing the opening in the process connection housing and including strain measurement resistors arranged on a side of the measurement membrane facing away from a process;
    a magnet assembly arranged in the process connection housing, a magnetic field of said magnet assembly being concentrated on a central region of the measurement membrane and penetrating through the measurement membrane into the process;
    electrodes lying diametrically opposite one another and formed outside a central region on a side of the measurement membrane facing the process; and
    further electrodes formed on the side of the measurement membrane facing the process, said further electrodes lying diametrically opposite one another perpendicular to arrangement of the electrodes;
    wherein the process connection housing includes electronic measuring equipment which is connected to the strain measurement resistors and the electrodes;
    wherein electronic measuring equipment is configured to perform pressure measurements and magnetic-inductive flow measurements in interaction with the strain measurement resistors and the electrodes;
    wherein the electronic measuring equipment is further configured to at least one of (i) measure an impedance or conductivity between the further electrodes and (ii) correct the magnetic-inductive flow measurement utilizing an electrical voltage detected between the further electrodes;
    wherein the pressure measurement cell having the measurement membrane abuts an inner shoulder of the process connection housing surrounding the opening;
    wherein the process connection housing includes an inner stop, a piezoceramic annular component lying between the inner stop and a rear side of the pressure measurement cell facing away from the process; and
    wherein the electronic measuring equipment is further connected to the piezoceramic annular component and is further configured to at least one of (i) detect pressure surges and (ii) measure an ultrasound-based fill level.

2. The multifunctional sensor as claimed in claim 1, wherein the electronic measuring equipment has a trigger input, via which said electronic measuring equipment is switched from an inactive state to an active state.

3. The multifunctional sensor as claimed in claim 2, wherein at least one of (i) the electrodes and (ii) the further electrodes are connected to the trigger input.

4. The multifunctional sensor as claimed in claim 1, wherein the electronic measuring equipment has a trigger input, via which said electronic measuring equipment is switched from an inactive state to an active state; and wherein the piezoceramic annular component is connected to the trigger input.

5. The multifunctional sensor as claimed in claim 4, wherein at least one of (i) the electrodes and (ii) the further electrodes are connected to the trigger input.

6. The multifunctional sensor as claimed in claim 1, further comprising:
    at least one temperature sensor affixed to the side of the measurement membrane facing away from the process;
    wherein the electronic measuring equipment is further configured to measure temperature.

7. The multifunctional sensor as claimed in claim 1, further comprising:
    a battery arranged in the process connection housing, said battery exclusively supplying current to the sensor.

8. The multifunctional sensor as claimed claim 1, further comprising:
    a communication device arranged in the process connection housing, said communication device wirelessly sending measurement values determined by the electronic measuring equipment.

* * * * *